(12) United States Patent
Kang et al.

(10) Patent No.: US 9,642,070 B2
(45) Date of Patent: May 2, 2017

(54) METHOD FOR AVOIDING INTERFERENCE IN WIRELESS LOCAL AREA NETWORK SYSTEM AND APPARATUS FOR PERFORMING THE SAME

(71) Applicant: Electronics and Telecommunications Research Institute, Daejeon (KR)

(72) Inventors: Hyun Duk Kang, Gwangju (KR); Gwang Zeen Ko, Daejeon (KR); Jin Hyung Oh, Daejeon (KR); Igor Kim, Daejeon (KR); Myung Sun Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 124 days.

(21) Appl. No.: 14/621,523

(22) Filed: Feb. 13, 2015

(65) Prior Publication Data
US 2015/0341847 A1   Nov. 26, 2015

(30) Foreign Application Priority Data
May 21, 2014  (KR) .................. 10-2014-0061118

(51) Int. Cl.
*H04W 48/16* (2009.01)
*H04W 24/02* (2009.01)
*H04W 84/12* (2009.01)

(52) U.S. Cl.
CPC .......... *H04W 48/16* (2013.01); *H04W 24/02* (2013.01); *H04W 84/12* (2013.01)

(58) Field of Classification Search
CPC .............................. H04W 48/16; H04W 24/02

USPC .......................................................... 370/329
See application file for complete search history.

(56) References Cited

U.S. PATENT DOCUMENTS

| | | | |
|---|---|---|---|
| 2003/0123405 A1 | 7/2003 | del Prado et al. | |
| 2004/0105449 A1* | 6/2004 | Jung | H04L 29/12009 370/401 |
| 2006/0025128 A1* | 2/2006 | Lee | H04W 36/0083 455/432.1 |
| 2011/0075556 A1* | 3/2011 | Li | H04W 28/08 370/230 |
| 2012/0051350 A1* | 3/2012 | Kim | H04W 76/023 370/338 |
| 2014/0355576 A1* | 12/2014 | Wang | H04W 48/12 370/336 |

FOREIGN PATENT DOCUMENTS

| | | |
|---|---|---|
| KR | 1020130138310 A | 12/2013 |
| WO | 2007055994 A2 | 5/2007 |

\* cited by examiner

*Primary Examiner* — Ronald B Abelson
(74) *Attorney, Agent, or Firm* — William Park & Associates Ltd.

(57) ABSTRACT

Disclosed are a method for avoiding interference in a wireless local area network system and an apparatus for performing the same. The method for avoiding interference by an access point in a wireless local area network system, includes receiving channel scan results from a station associated with the access point; setting connection with an adjacent access point based on the channel scan results; determining an access point to be associated with the station through negotiation with the adjacent access point; and transmitting a reassociation request message to request reassociation with the adjacent access point to the station when the negotiation with the adjacent access point succeeds.

13 Claims, 10 Drawing Sheets

METHOD FOR AVOIDING INTERFERENCE IN WIRELESS LOCAL AREA NETWORK SYSTEM AND APPARATUS FOR PERFORMING THE SAME

This application claims the benefit of priority of Korean Patent Application No. 10-2014-0061118 filed on May 21, 2014, which is incorporated by reference in its entirety herein.

BACKGROUND OF THE INVENTION

Field of the Invention

The present invention relates to a method for avoiding interference between adjacent basic service sets (BSSs) in a wireless local area network (hereinafter referred to as 'WLAN') system and an apparatus for performing the same.

Related Art

In recent years, as supply and use of mobile devices such as a smart phone and a tablet personal computer (PC) have increased, a use zone and a user of a WLAN using a non-licensed band have rapidly increased. In at least half of internet traffic previously depends on the WLAN. Accordingly, interference between adjacent access points (APs) and interference between stations (STAs) associated with adjacent different APs, that is, included in different BSSs become a main cause to lower performance of the WLAN. In order to efficiently use a frequency resource, to solve interference between adjacent BSSs is extremely attractive. In order to minimize the interference between BSSs and to efficiently use the frequency resource, a distribution state of an AP and an STA causing interference between BSSs is recognized. Accordingly, it is important to apply an effective interference avoiding method.

As an example of a method for avoiding interference in a WLAN, Korean Patent Publication No. 10-2003-0018051 (published on Mar. 4, 2003) discloses an overlapping network allocation vector for avoiding collision in IEEE 802.00 WLAN operating under an HCF. In Korean Patent Publication No. 10-2003-0018051, a method for avoiding collisions between a plurality of stations located in two or more basic service sets (BSSs) and operating in the same channel, includes the steps of: the mobile station receiving a frame, the frame including information indicative of which of basic service sets (BSSs) are transmitting the frame to the mobile station; the mobile station updating a first counter when the received frame is determined to be from its corresponding BSS; the mobile station updating a second counter when the received frame is determined to be from an overlapping BSS; and, the mobile station transmitting within its corresponding BSS when the first counter and the second counter are zeros. Meanwhile, for example, an existing method of avoiding interference between BSSs includes a centralized interference avoiding method using an AP controller applied to an enterprise network and a method of avoiding interference based on energy detection based on clear channel assessment (CCA). The centralized interference avoiding method is available in a business network or an enterprise network but has a difficulty in being used between other business networks, in public places, and an environment in which private APs exist. The method of avoiding interference based on energy detection based on clear channel assessment (CCA) has a difficulty in efficiently avoiding interference according to various distribution situations of the AP and the STA causing interference between BSSs. Accordingly, there is a need for a method of avoiding interference in a new scheme capable of being widely and generally used to be applicable to a WLAN standard technology by taking into consideration an interference situation between BSSs having various forms, and an information exchange method using the same.

SUMMARY OF THE DISCLOSURE

The present invention has been made in an effort to solve the above-described problems associated with prior art. The present invention provides a method for avoiding interference in a WLAN system capable of avoiding interference according to a distribution state of APs and STAs in a WLAN system constituting an overlapping basic service set (OBSS) and an apparatus for performing the same.

In accordance with an aspect of the present invention, there is provided a method for avoiding interference by an access point in a wireless local area network system, including: receiving channel scan results from a station associated with the access point; setting connection with an adjacent access point based on the channel scan results; determining an access point to be associated with the station through negotiation with the adjacent access point; and transmitting a reassociation request message to request reassociation with the adjacent access point to the station when the negotiation with the adjacent access point succeeds.

The channel scan results may include information on an access point detected by performing a channel scan by the station.

The setting of the connection may include: determining whether there is a hidden access point based on the channel scan results; and performing hidden access point discovery when there is the hidden access point.

The determining of the access point may include determining an access point to be associated with the station by comparing at least one of the number of stations associated with the access point and the adjacent access point respectively, and traffics applied to the access point and the adjacent access point respectively.

The determining of the access point may include transmitting a negotiation request message including at least one of an identifier of a station associated with the access point, information on whether to reassociate the station with the adjacent access point; and information on presence of a station to be reassociated with the access point among stations associated with the adjacent access point.

The determining of the access point may include receiving a negotiation response message including at least one of an identifier of a station associated with the adjacent access point, information on whether to reassociate the station associated with the adjacent access point with the access point, information on whether to accept reassociation with a station which is reassociation-requested from the access point, and information on whether to succeed the negotiation.

In accordance with another aspect of the present invention, there is provided a method for avoiding interference by a station in a wireless local area network system, including: detecting associatable access points by performing a channel scan; selecting an access point to be associated from the detected associatable access points; associating with the selected access point to transmit a result of the channel scan to the associated access point; and transmitting a disassociation request message to the associated access point and transmitting a reassociation request message to one of the detected access points when a message to request reassociation with another access point is received from the associated access point.

In accordance with another aspect of the present invention, there is provided an access point for constituting a wireless local area network system, including: a receiver to receive channel scan results from a station associated with the access point; a processor to set connection with an adjacent access point based on the channel scan results, and to determine an access point to be associated with the station through negotiation with the adjacent access point; and a transmitter to transmit a reassociation request message to request reassociation with the adjacent access point to the station when the negotiation with the adjacent access point succeeds.

In accordance with another aspect of the present invention, there is provided a station including: a processor to detect associatable access points by performing a channel scan and to select an access point to be associated from the detected associatable access points; a transmitter to transmit an association request message to the selected access point and a result of the channel scan; and a receiver to receive an association response message with respect to the association request message from the selected access point, wherein the transmitter transmits a disassociation request message to the selected access point and transmits a reassociation request message to one of the detected access points when a message to request reassociation with another access point is received from the selected access point.

When an overlapping zone is located between BSSs, STAs included in the overlapping zone may reduce a probability of generating interference between adjacent APs by using a network allocation vector (NAV) signal from one AP.

The probability of generating interference between APs may be reduced by adjusting the number of APs to be participated in an overlapping zone between BSSs by applying a multiple AP co-channel concurrent use technology (for example, interference alignment and the like).

In a state that an AP to which a specific interference avoiding technology is applicable and an AP to which a specific interference avoiding technology is not applicable coexist, a corresponding interference avoiding technology is applicable by associating STAs located in an overlapping zone between the BSSs to the AP to which a specific interference avoiding technology is applicable.

DESCRIPTION OF EXEMPLARY EMBODIMENTS

Figure 1:
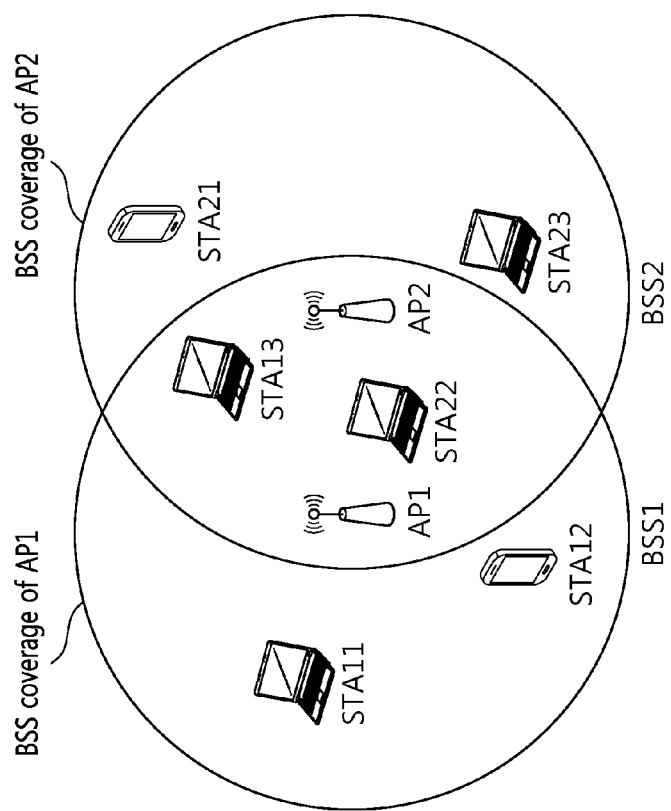
FIGS. 1 to 4 are diagrams illustrating various distribution states of an AP and an STA in a WLAN system.

The above objects, features, and advantages can be more clearly comprehended through the following description in relation to accompanying drawings. Accordingly, those skilled in the art can easily realize the present inventive concept. In the following description, if detailed description about well-known functions or configurations may make the subject matter of the disclosure unclear, the detailed description will be omitted. The similar components will be assigned with the similar reference numerals through the specification.

In the following description, when a part is referred to as it includes a component, the part may not exclude other components, but further include another component unless the context indicates otherwise. As used in this embodiment, the term '~unit' means to perform some functions. The '~unit' may be implemented by hardware, software, and a combination thereof.

FIGS. 1 to 4 are diagrams illustrating various distribution states of an AP and an STA in a WLAN system.

Figure 2:
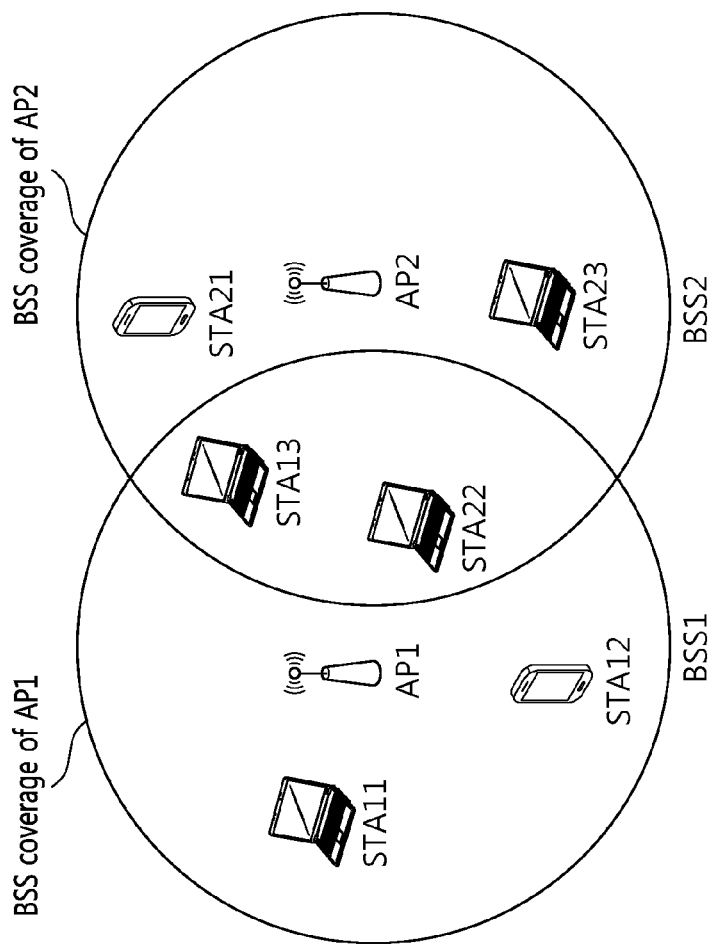
Figure 3:
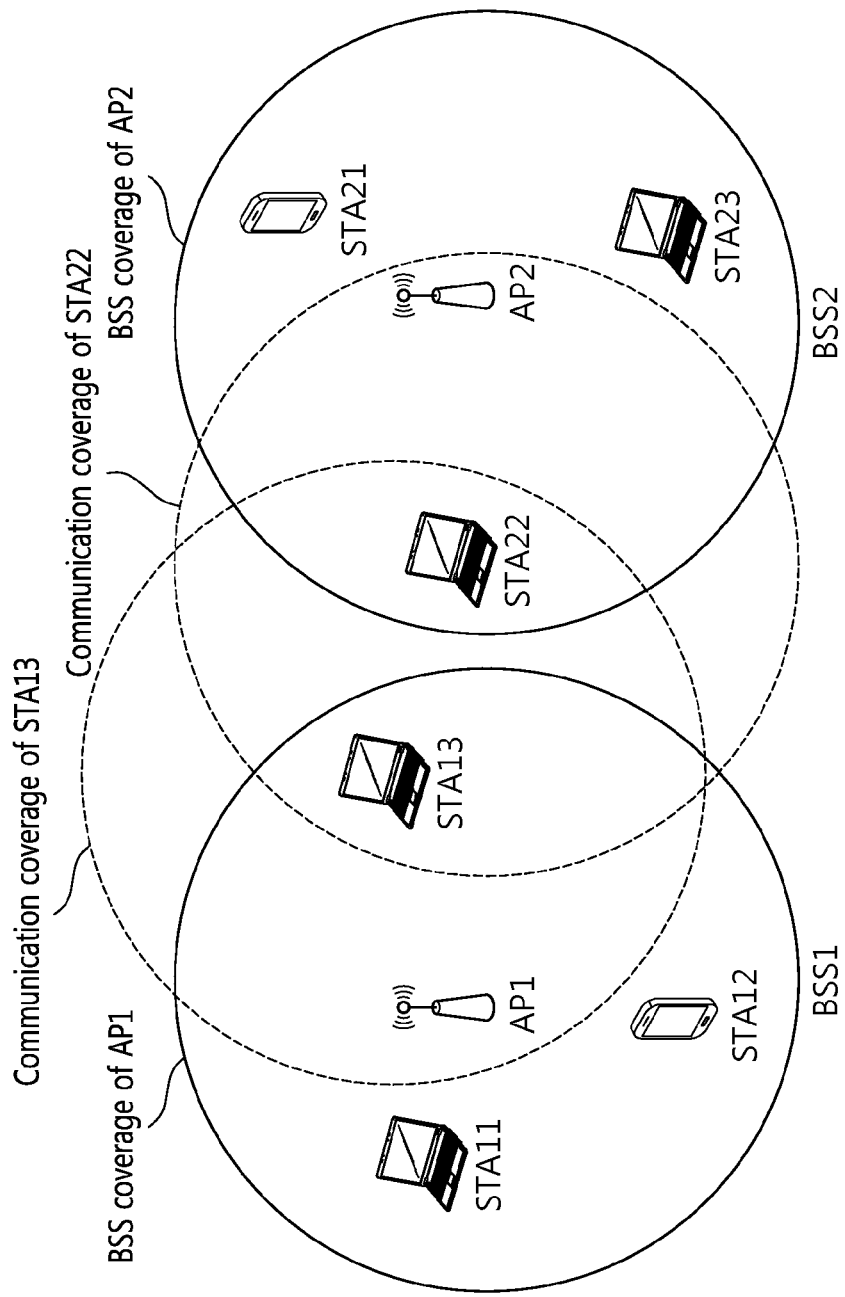
Figure 4:
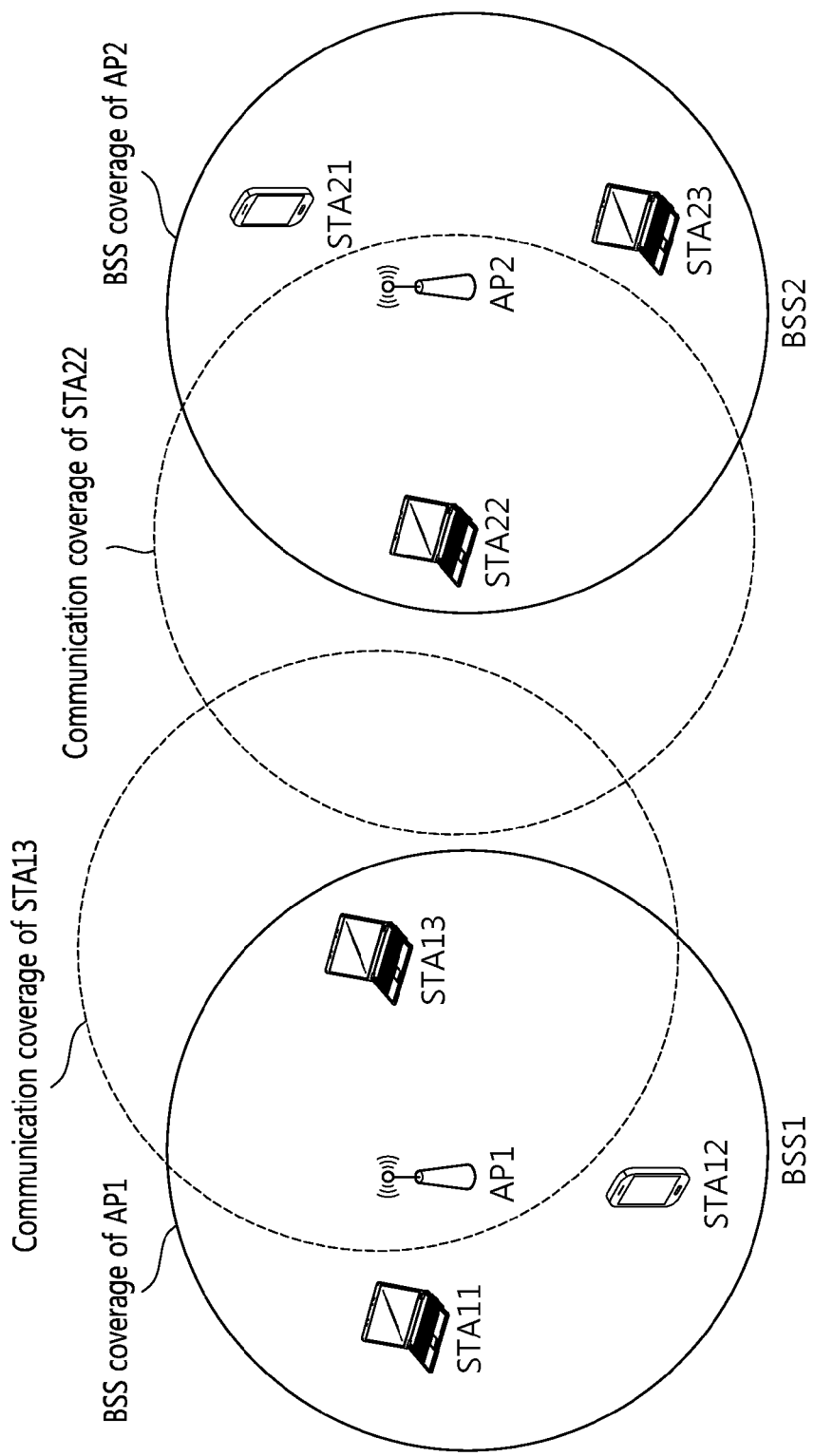

For example, FIGS. 1 and 2 illustrate a case where an OBSS is configured by overlapping BSS coverage BSS1 of a first AP AP1 with overlapping BSS coverage BSS2 of a second AP AP2. FIGS. 3 and 4 illustrate a case where the OBSS is not configured.

Interference between APs, interference between STAs associated with different APs (hereinafter referred to as 'interference between STAs'), and interference between the AP and an STA which does not associate the AP may be generated according to a distribution state of the AP and the STA in the WLAN.

First, referring to FIG. 1, FIG. 1 illustrates a case where the AP1, the AP2, an STA13, and an STA22 are located in an overlapping zone between the BSS1 and the BSS2. An STA11 represents a first STA associating with the AN, an STA12 represents a second STA associating with the AN, and STA13 represents a third STA associating with the AP1. In the same manner, an STA21 represents a first STA associating with the AP2, an STA22 represents a second STA associating with the AP2, and an STA23 represents a third STA associating with the AP2. In this case, since the AP1 and the AP2 use different Network Allocation Vector (NAV) signals, interference may be generated between the AP1 and the AP2, between the AP1 and the STA22, between the AP2 and the STA13, and between the STA13 and the STA22.

Next, FIG. 2 illustrates a case where the STA13 and the STA22 are located in an overlapping zone between the BSS1 and the BSS2. In this case, the interference may also be generated between the AP1 and the AP2, between the AP1 and the STA22, between the AP2 and the STA13, and between the STA13 and the STA22.

Meanwhile, in a case of FIG. 3, since adjacent STAs (STA13 and STA22) which are not located in an overlapping zone between BSSs but are located in a BSS boundary zone are included in communication coverage of each other, the interference may be generated between the adjacent STAs. FIG. 4 illustrates a case where interference is generated or is not generated between adjacent STAs (STA13 and STA22) which are not located in an overlapping zone between BSSs but are located in a BSS boundary zone. If a degree of the interference is represented as first, second, and third grades based on a size of an overlapping zone of the BSS in a case of FIGS. 1 to 3, the degree of the interference in FIG. 1 may be the first grade, the degree of the interference in FIG. 2 may be the second grade, and the degree of the interference in FIG. 3 may be the third grade.

FIGS. 1 to 3 may be classified into following two cases according to whether to detect an adjacent AP. FIG. 1 illustrates an interference state capable of detecting an adjacent AP. That is, each AP may recognize presence of each other by directly receiving a beacon signal from the adjacent AP, and accordingly connection setup is possible for exchanging information between adjacent APs. In the meantime, FIGS. 2 and 3 illustrate an interference state capable of not detecting the adjacent AP. That is, since each AP cannot directly receive a beacon signal from the adjacent AP, the APs have a hidden AP relation to each other. In this case, there is a need for a method capable of detecting an adjacent hidden AP for connection setup to exchange information between adjacent APs.

Accordingly, a method of avoiding interference between adjacent BSSs in a WLAN system according to the embodiment of the present invention may easily control between the adjacent APs for avoiding the interference between the BSSs and may minimize interference between STAs in an overlapping zone by adjusting the number of AP to be associated with STAs in an overlapping zone between BSSs causing interference when there is an overlapping zone between BSSs as shown in FIGS. 1 and 2 by taking into consideration various distribution states of an AP and an STA causing the interference between the BSSs. Hereinafter, in order to reduce the number of APs associating with STAs located in an overlapping zone between BSSs, a process of re-associating a specific STA associated with a specific AP with another AP refers to station association filtering (SAF).

Figure 5:
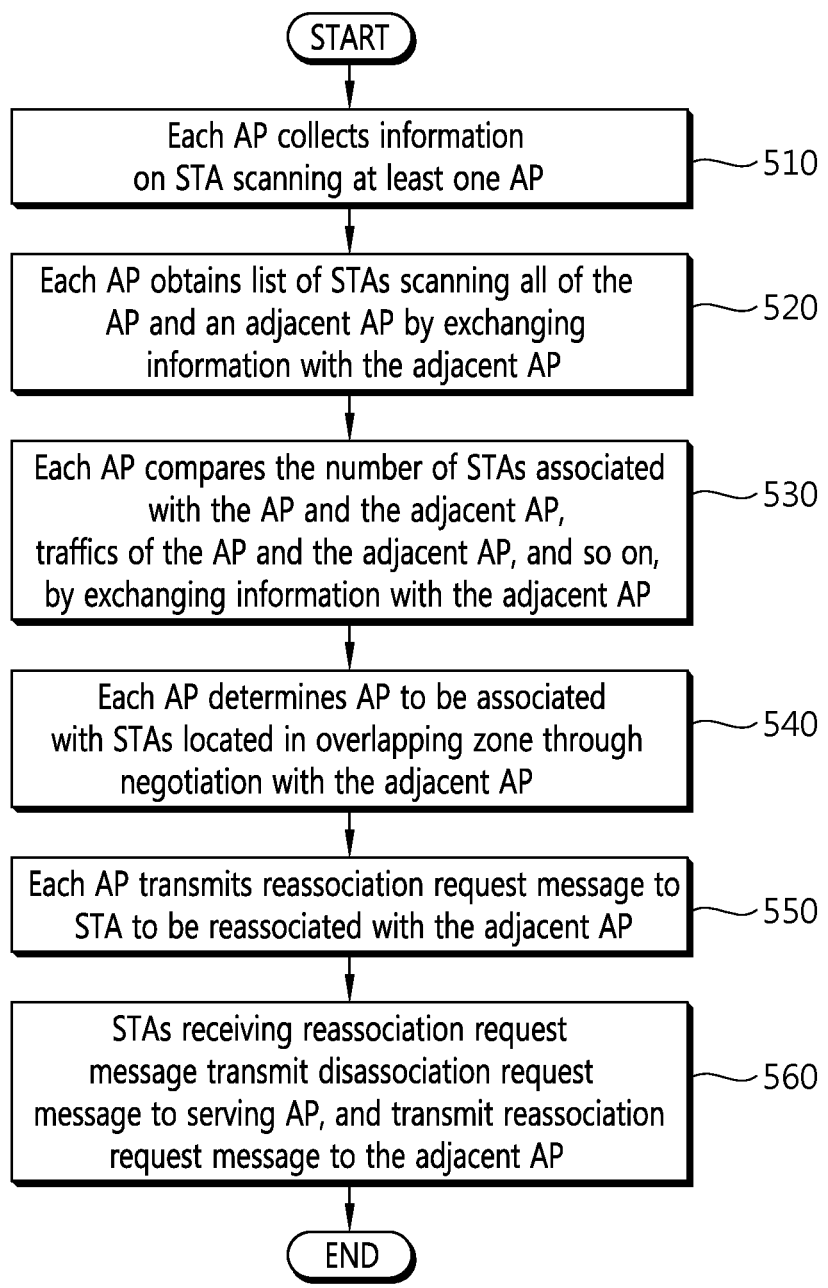
FIG. 5 is a flowchart illustrating a method for avoiding interference in a WLAN system according to an embodiment of the present invention.

FIG. 5 is a flowchart illustrating a method for avoiding interference in a WLAN system according to an embodiment of the present invention.

APs constituting the WLAN system scan a wireless channel to select an operation channel according to scan results. Meanwhile, the STAs scan the wireless channel to request association to a corresponding AP according to the scan results.

Each AP associates STAs requesting association with the AP with each other, and collects information on an STA scanning at least one AP among the associated STAs (510). Next, each AP obtains a list of STAs scanning all of the AP and an adjacent AP by exchanging information with the adjacent AP (520). Each AP compares the number of STAs associated with the AP and the number of STAs associated with the adjacent AP, an offered traffic applied to each AP, and so on, by exchanging information with the adjacent AP (530). Each AP determines an AP to be associated with STAs located in an overlapping zone between BSSs through negotiation with adjacent APs constituting OBSS according to the comparison result (540).

When SAF negotiation with the adjacent APs constituting the OBSS succeeds, each AP transmits a message APReassociation_Request to request reassociation of the adjacent AP to an STA to be reassociated with the adjacent AP (550). When receiving the reassociation request message, the STAs may transmit a disassociation request message Disassociation_Request to a serving AP, and may transmit a reassociation request message Reassociation_Request to the adjacent AP (560). Step 540 to step 560 may be repeatedly performed until the review for all adjacent APs is completed.

Figure 6:
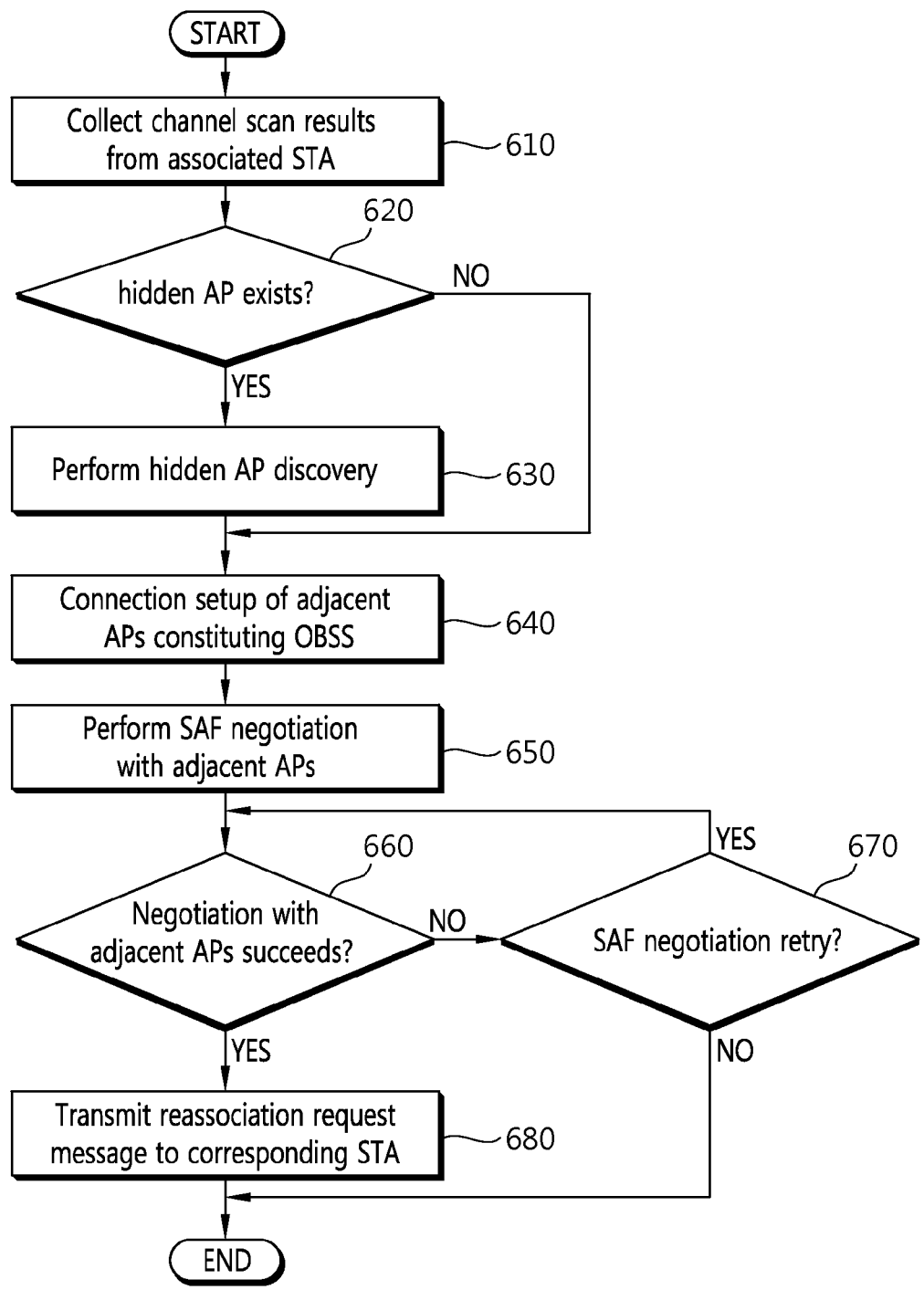
FIG. 6 is a flowchart illustrating an operation of an AP for a method for avoiding interference according to an embodiment of the present invention.

FIG. 6 is a flowchart illustrating an operation of an AP for a method for avoiding interference according to an embodiment of the present invention. Hereinafter, a method of avoiding interference according to an embodiment of the present invention performed by the AP will be described in detail with reference to FIG. 6.

Each AP scans a wireless channel and selects an operation channel to be operated. In this case, when receiving an association request message Association_Request from a specific STA, each AP transmits an association response message Association_Response to the STA to associate with the STA. Next, each AP collects channel scan results of STAs associated with the AP (610). When it is determined that there is a hidden AP based on the collected channel scan results (620), each AP performs hidden AP discovery to detect a hidden AP (630). In this case, the hidden AP means an AP which configures an OBSS but a presence thereof is not detected because the AP cannot directly receive a beacon signal from an adjacent AP. The process of detecting the hidden AP may be performed with respect to channel scan results of all STAs associated with each AP.

After that, each AP performs connection setup of adjacent APs constituting the OBSS (640). Each AP selects an STA to be associated with the adjacent AP among STAs associated with the AP and an STA to be reassociated with the AP among STAs associated with the adjacent AP to perform SAF negotiation with the adjacent APs (650).

When the negotiation with the adjacent APs constituting the OBSS fails (660), each AP may retry the SAF negotiation according to whether to retry the SAF negotiation (670). When the negotiation with the adjacent APs constituting the OBSS succeeds (660), each AP transmits a message APReassociation_Request to request reassociation request to the adjacent AP to an STA associated with the AP (680). This step may be repeatedly performed until the review for all adjacent APs is completed.

Meanwhile, when channel scan results of the STA are updated, each AP may perform the above hidden AP discovery process based on the updated channel scan results. When there is an SAF negotiation request from the adjacent AP, each AP may perform the SAF negotiation in response thereto.

For example, although FIG. 6 illustrates a process of avoiding interference between BSSs through the negotiation between APs in a distributed topology scheme, an AP controller to manage APs may adjust the number of APs to be associated with STAs in an overlapping zone between BSSs and may indicate a command therefore to a corresponding AP by directly determining a certain AP to be associated with a certain STA in a centralized topology scheme. In addition, in a standalone topology scheme, since the negotiation between APs with respect to STAs located in an overlapping zone is impossible, each AP may transmit a message to request reassociation with an adjacent AP to STAs associated with the AP according to a creative determination.

Figure 7:
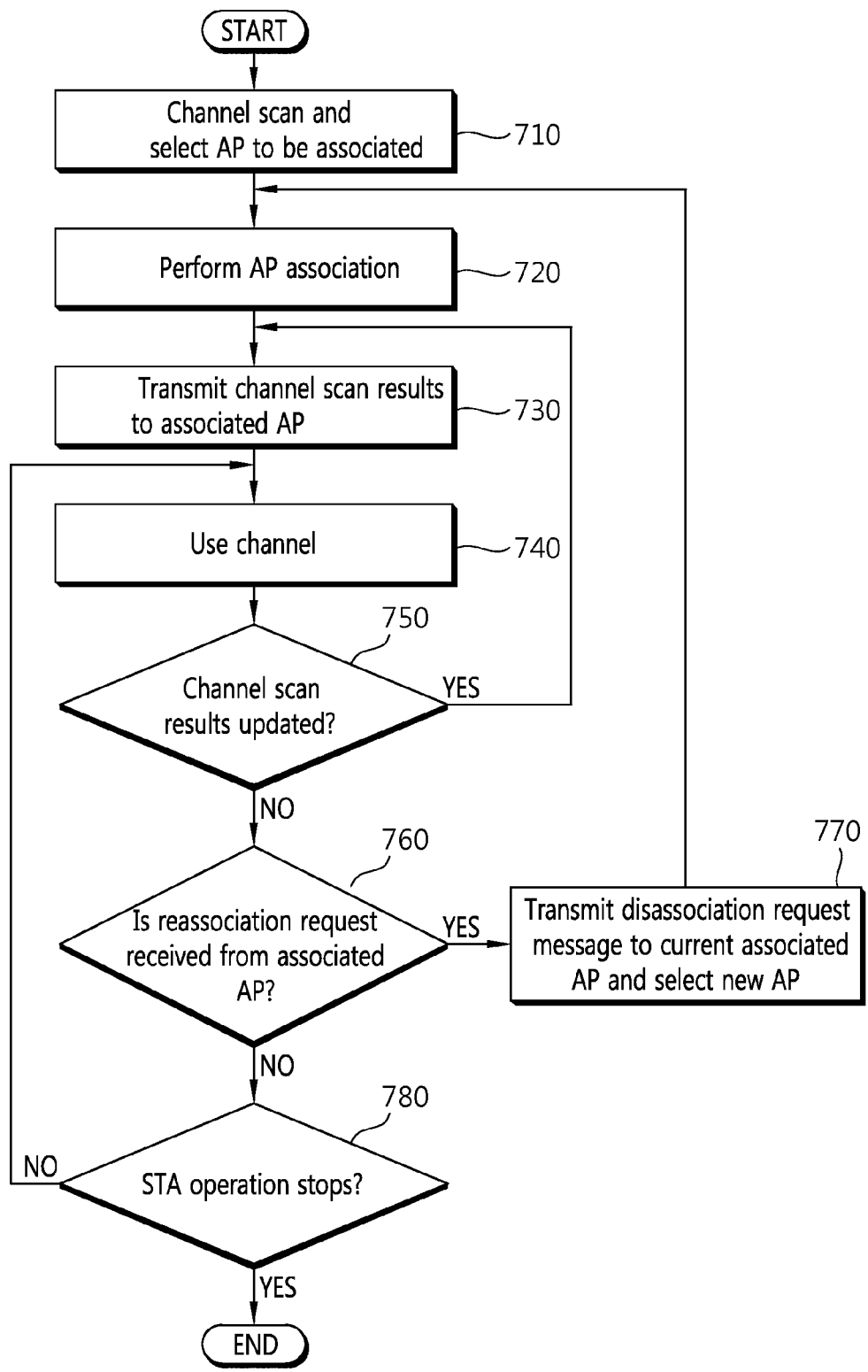
FIG. 7 is a flowchart illustrating an operation of an STA for a method for avoiding interference in a WLAN according to an embodiment of the present invention.

FIG. 7 is a flowchart illustrating an operation of an STA for a method for avoiding interference in a WLAN according to an embodiment of the present invention. Hereinafter, a method of avoiding interference according to an embodiment of the present invention performed by the STA will be described in detail with reference to FIG. 7.

The STA performs channel scan. If at least associatable AP is detected, the STA selects an AP to be associated with among the detected APs (710). Next, the STA performs AP association by transmitting an association request message Association_Request to the AP to be associated and by receiving an association response message Association_Response from a corresponding AP (720). Next, the STA transmits channel scan results (list of APs detected through the channel scan) to the associated AP (serving AP) (730), and is operated to use an operation channel of a corresponding AP (740). In this case, the STA may periodically scan the channel. When the channel scan results are updated, the STA transmits the updated channel scan results to the associated AP (750).

When the message APReassociation_Request to request reassociation with another AP is received from the serving AP because the negotiation between the serving AP and the adjacent AP succeeds, the STA transmits a disassociation request message Disassociation_Request to the serving AP to select a new AP (AP adjacent to the serving AP) (770). Next, the STA transmits the reassociation request message Reassociation_Request to the new AP and receives a reassociation response message from a corresponding AP (720). This step may be performed until the STA stops the operation (780). In this case, the message APReassociation_Request to request reassociation to another AP may include information (for example, identifier) on an AP to be associated with the STA. In this case, the negotiation between the serving AP and the adjacent AP may be performed by transmitting a negotiation request message including at least one of an identifier of an STA associated with the serving AP, information on whether to reassociate the STA with another AP, and information on presence of a STA to be reassociated with the serving AP among STAs associated with the another AP to another AP by the serving AP, and by receiving an negotiation response message including an identifier of an STA associated with the another AP, information on whether to reassociate the STA associated with another AP with the serving AP, information on whether to accept reassociation with an STA reassociation-requested from the serving AP, and information on whether to succeed the negotiation from the another AP from the another AP.

Figure 8:
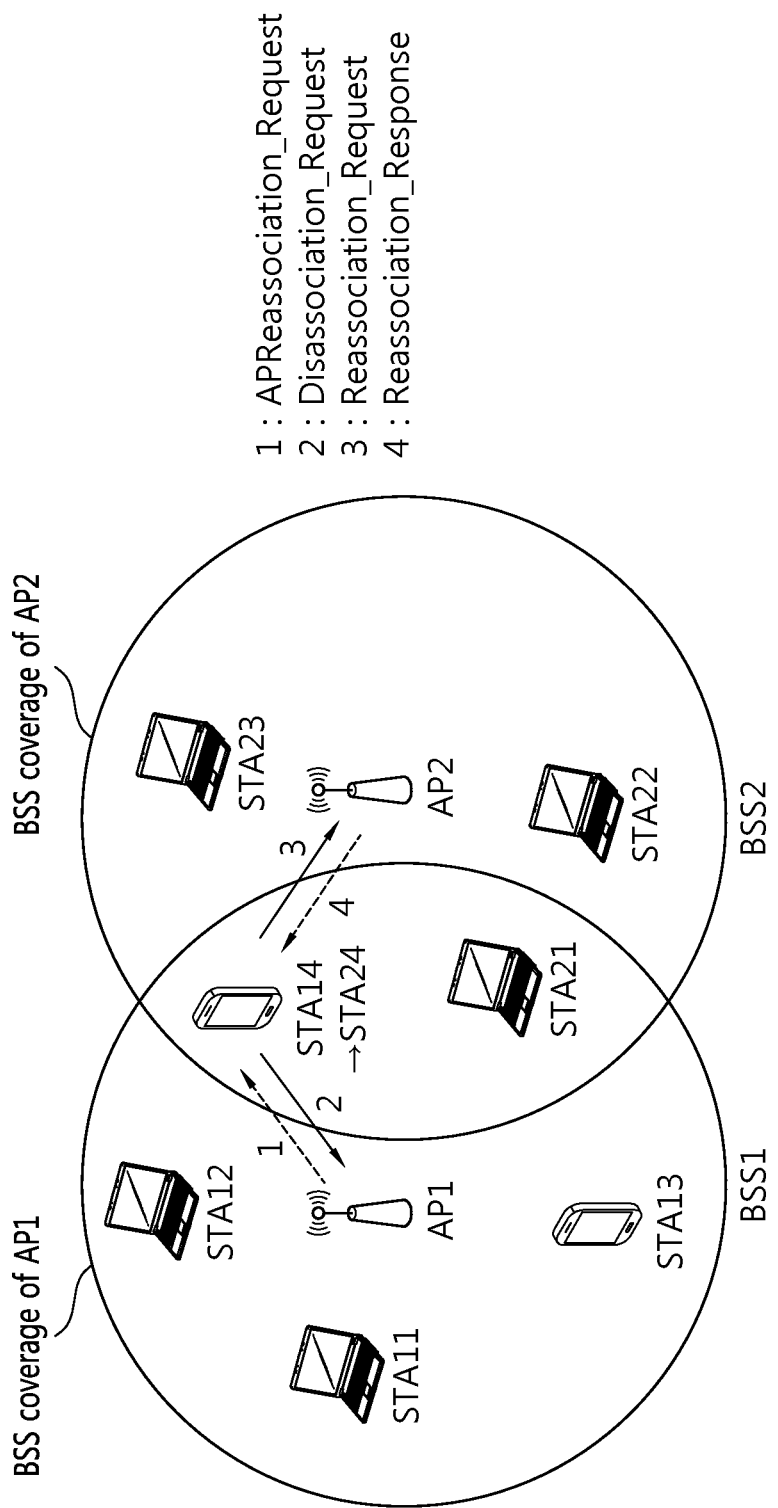
FIG. 8 is a diagram illustrating a process of re-associating an STA located in an overlapping zone between BSSs to an adjacent AP.
Figure 9:
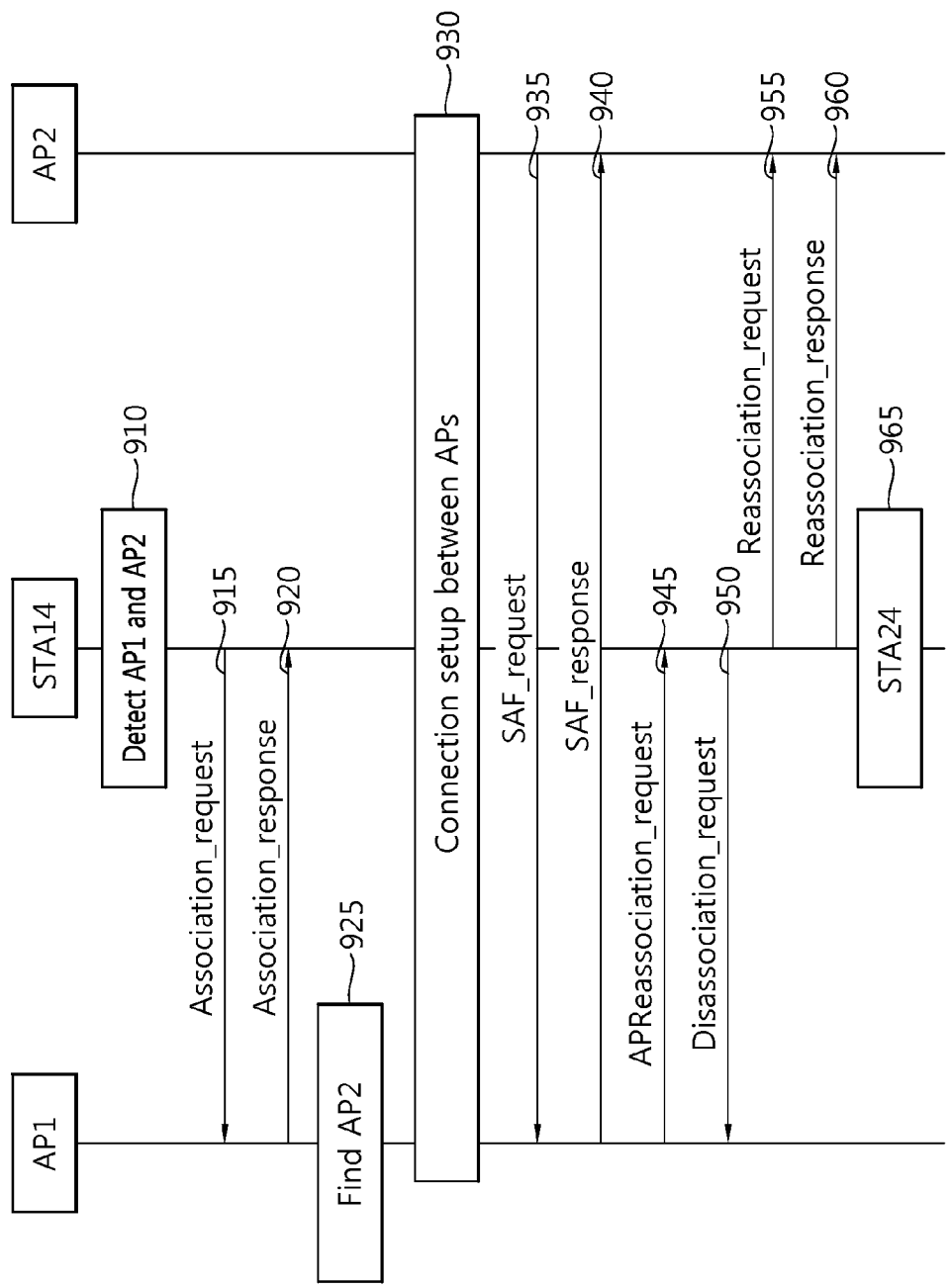
FIG. 9 is a timing chart illustrating a message transfer process in a case of FIG. 8.

FIG. 8 is a diagram illustrating a process of re-associating an STA located in an overlapping zone between BSSs to an adjacent AP, and FIG. 9 is a timing chart illustrating a message transfer process in a case of FIG. 8.

First, referring to FIG. 8, FIG. 8 illustrates a case where an STA14 becomes an STA24 by reassociating the STA14 associated with an AP1 with an AP2 in an overlapping zone between BSSs by using a method for avoiding interference according to an embodiment of the present invention. To this end, the AP1 may transmit a message APReassociation_Request to request reassociation with another AP (AP2) to the STA14 through the negotiation with the AP2. When receiving the message APReassociation_Request to request association with another AP from the AP1, the STA14 transmits a disassociation message Disassociation_Request to the AP1. Next, the STA14 transmits a reassociation request message Reassociation_Request to the AP2, and receive a reassociation response message Reassociation_Response from the AP2 to become an STA24. Since only the STA21 and the STA24 associated with the AP2 are located in an overlapping zone between BSS coverage (BSS1) of the AP1 and BSS coverage (BSS2) of the AP2, the interference between BSSs may be efficiently avoided through the above process.

In detail, referring to FIG. 9, when an AP1 and an AP2 are detected (910), an STA14 selects an AP (AP1) to be associated based on a received signal strength indicator (RSSI) from each AP. Next, the STA14 transmits an association request message Association_Request to the AP1 (915), and receives an association response message Association_Response which is a response message thereto from the AP1 (920) to associate with the AP1. In this case, the STA14 transmits channel scan results (information on the AP1 and the AP2) to the AP1 during a procedure of associating with the AP1 so that the AP1 may know presence of the AP2 being an adjacent AP (925).

If the presence of the AP2 is recognized based on the channel scan results received from the STA14, the AP1 performs connection setup with the AP2 using a wired network or a wireless network (930). The AP1 performs negotiation with which AP an AP2 and an STA (STA14) of an overlapping zone are associated by exchanging a negotiation request message SAF_Request and a negotiation response message SAF_Response based on the above (935, 940). For example, the negotiation request message SAF_Request may include identifiers STA11, STA12, STA13, and STA14 of STAs associated with the AP (AP1) transmitting the message, information on whether to reassociate the STA with an adjacent AP (AP2), and information on presence of an STA to be reassociated with the AP (AP1) transmitting the message among STAs (STA21, STA22, STA23) associated with the AP (AP2) receiving the request message. For example, the negotiation response message SAF_Response may include identifiers of STAs (STA21, STA22, and STA23) associated with an AP (AP2) transmitting the message, information on whether to reassociate the STA with the adjacent AP (AP1), information on whether to accept reassociation with an STA (STA14) reassociation-requested from the AP (AP1) transmitting the negotiation request message, and information on success or failure of the SAF negotiation.

If the negotiation is achieved to reassociate the STA14 with the AP2, the AP1 transmits a message APReassociation_Request to request reassociation with the AP2 to the STA14 (945). If receiving the message APReassociation_Request, the STA14 transmits a disassociation request message Disassociation_Request a current associated AP (AP1) (950), and transmits a reassociation request message Reassociation_Request to an AP (AP2) to be newly associated (955). If receiving the reassociation request message Reassociation_Request, the AP2 transmits a reassociation response message Reassociation_Response to a corresponding STA (STA14) (960). Through the above step, the STA (STA14) associated with the AP1 is reassociated with the AP2 (965).

Figure 10:
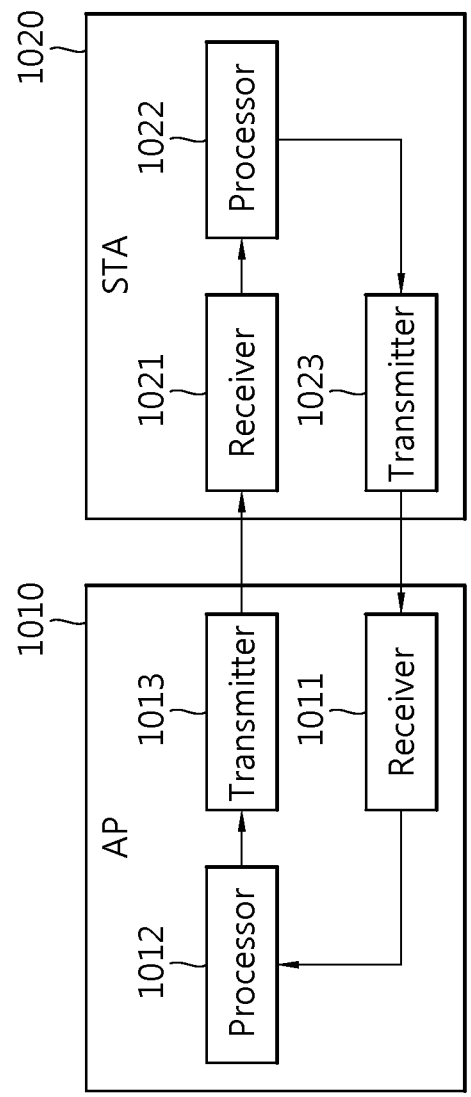
FIG. 10 is a block diagram illustrating an AP and a STA according to an embodiment of the present invention.

Meanwhile, although FIG. 10 illustrates a case where the AP1 and the AP2 exchange the negotiation request message SAF_Request and a negotiation response message SAF_Response with each other in a wired/wireless scheme through connection setup through a wired network or a wireless network, each AP may exchange a message through an STA (STA14) located in an overlapping zone. Further, the negotiation between APs may require a predetermined number of times of message exchanges until success is achieved. The number of times may be limited. If the negotiation does not succeed within the limited number of times, it may be considered that the negotiation fails.

FIG. 10 is a block diagram illustrating an AP and a STA according to an embodiment of the present invention. Referring to FIG. 10, an AP 1010 according to the present invention includes a receiver 1011, a processor 1012, and a transmitter 1013. A station 1020 according to the present invention includes a receiver 1021, a processor 1022, and a transmitter 1023.

First, the AP 1010 is described. The receiver 1011 receives an association request message Association_Request from the station 1020, and receives channel scan results. The channel scan results may include information on an AP detected when the station 1020 performs channel scan.

The processor 1012 of the AP 1010 scans a wireless channel to select an operation channel. In this case, if receiving an association request message Association_Request from the station 1020 through the receiver 1011, the processor 1022 generates an association response message Association_Response thereto and transmits the generated message to the station 1020 through the transmitter 1013 so that the station 1020 may associate with the AP 1010. Meanwhile, the processor 1012 may set connection with an adjacent AP (not shown) using the channel scan results of the station 1020 received through the receiver 1011. The processor 1012 may determine an AP to be associated with the station 1020 through negotiation with the adjacent AP. In this case, the processor 1012 determines whether there is a hidden AP based on the channel scan results collected from stations associated with the AP. When it is determined that there is the hidden AP, the processor 1012 may perform discovery of the hidden AP.

Further, the processor 1012 selects a station to be reassociated with an adjacent AP among stations associated with the AP and a station to be reassociated with the AP among stations associated with the adjacent AP through information exchange with the connection setup adjacent AP to perform SAF negotiation with the adjacent AP. For example, the processor 1012 may compare the number of stations associated with the AP with the number of stations associated with the adjacent AP, compare traffics applied to the AP with traffics applied to the adjacent AP, and so on, based on information exchange with the adjacent AP to determine an AP to be associated with the station 1020. In addition, the processor 1012 may generate a negotiation request message including at least one of an identifier of a station associated with the AP, information on whether to reassociate the station with the adjacent AP, and information on presence of a station to be reassociated with the AP among stations associated with the adjacent AP.

The transmitted 1013 transmits the negotiation request message to the adjacent AP. Moreover, when the negotiation with the adjacent AP succeeds, the transmitter 1013 transmits a reassociation request message to request reassociation with the adjacent AP to the station 1020. For example, the reassociation request message may include information on the adjacent AP.

The processor 1012 may receive a negotiation response message with respect to the negotiation request message through the receiver 1011 to determine whether to succeed the negotiation based on the received negotiation response message. For example, the negotiation response message may include at least one of an identifier of a station associated with the adjacent AP, information on whether to reassociate the station associated with the adjacent AP with the AP 1010, information on whether to accept reassociation with a station which is reassociation-requested from the AP 1010, and information on whether to succeed the negotiation. When the negotiation with the adjacent AP fails, the processor 1011 may try the negotiation a preset number of times.

Meanwhile, the receiver 1021 of the station 1020 may receive an association response message with respect to the association request message transmitted to the AP 1010 by the station 1020 from the AP 1010. When the station 1020 is associated with the AP 1010, the receiver 1021 of the station 1020 may receive a message to request reassociation with another AP.

A processor 1022 of the station 1020 detects associatable APs by performing channel scan, and selects an AP to be associated among the detected APs.

The transmitter 1023 of the station 1020 transmits an association request message and the channel scan results to the AP selected by the processor 1022. In addition, when receiving a message to request reassociation with another AP from the AP 1010, the transmitter 1023 of the station 1020 may transmit a disassociation request message to a corresponding AP 1010 and may transmit a reassociation request message to one of APs detected through the channel scan.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for avoiding interference by an access point in a wireless local area network system, the method comprising:
   receiving channel scan results from a station associated with the access point;
   setting connection with an adjacent access point based on the channel scan results;
   determining an access point to be associated with the station through negotiation with the adjacent access point; and
   transmitting a reassociation request message to request reassociation with the adjacent access point to the station when the negotiation with the adjacent access point succeeds,
   wherein the determining an access point comprises comparing at least one of the number of stations associated with the access point and the adjacent access point respectively, and traffics applied to the access point and the adjacent access point respectively, and
   wherein the determining of the access point comprises transmitting a negotiation request message including at least one of an identifier of a station associated with the access point, information on whether to reassociate the station with the adjacent access point; and information on presence of a station to be reassociated with the access point among stations associated with the adjacent access point.

2. The method of claim 1, wherein the channel scan results comprise information on an access point detected by performing a channel scan by the station.

3. The method of claim 1, wherein the setting of the connection comprises:
   determining whether there is a hidden access point based on the channel scan results; and
   performing hidden access point discovery when there is the hidden access point.

4. The method of claim 1, wherein the determining of the access point comprises receiving a negotiation response message including at least one of an identifier of a station associated with the adjacent access point, information on whether to reassociate the station associated with the adjacent access point with the access point, information on whether to accept reassociation with a station which is reassociation-requested from the access point, and information on whether to succeed the negotiation.

5. A method for avoiding interference by a station in a wireless local area network system, the method comprising:
   detecting associatable access points by performing a channel scan;
   selecting an access point to be associated from the detected associatable access points;

associating with the selected access point to transmit a result of the channel scan to the associated access point; and transmitting a disassociation request message to the associated access point and transmitting a reassociation request message to one of the detected access points when a message to request reassociation with another access point is received from the associated access point, wherein a negotiation between the access point and the another access point is performed by transmitting a negotiation request message including at least one of an identifier of the station associated with the access point, information on whether to reassociate the station with the another access point, and information on presence of a station to be reassociated with the access point among stations associated with the another access point to the another access point by the access point, and by receiving an negotiation response message including an identifier of a station associated with the another access point, information on whether to reassociate the station associated with the another access point with the access point, information on whether to accept reassociation with a station reassociation-requested from the access point, and information on whether to succeed the negotiation from the another access point.

6. The method of claim 5, wherein the channel scan results comprise information on an access point detected by performing a channel scan by the station.

7. The method of claim 5, further comprising transmitting an updated scan channel to the access point when the channel scan result is updated after the transmitting of the disassociation request message.

8. The method of claim 5, wherein the message to request reassociation with another access point comprises information on an access point to be reassociated with the station.

9. The method of claim 5, wherein the message to request reassociation with the another access point is received from the access point when negotiation between the access point and the another access point succeeds.

10. An access point for constituting a wireless local area network system, the access point comprising:

a receiver to receive channel scan results from a station associated with the access point;

a processor to set connection with an adjacent access point based on the channel scan results, and to determine an access point to be associated with the station through negotiation with the adjacent access point; and a transmitter to transmit a reassociation request message to request reassociation with the adjacent access point to the station when the negotiation with the adjacent access point succeeds, wherein the processor determines an access point to be associated with the station by comparing at least one of the number of stations associated with the access point and the adjacent access point respectively, and traffics applied to the access point and the adjacent access point respectively, and wherein the transmitter transmits a negotiation request message including at least one of an identifier of a station associated with the access point, information on whether to reassociate the station with the adjacent access point; and information on presence of a station to be reassociated with the access point among stations associated with the adjacent access point.

11. The access point of claim 10, wherein the channel scan results comprise information on an access point detected by performing a channel scan by the station.

12. The access point of claim 10, wherein the processor determines whether there is a hidden access point based on the channel scan results, and performs hidden access point discovery when there is the hidden access point.

13. The access point of claim 10, wherein the receiver receives a negotiation response message including at least one of an identifier of a station associated with the adjacent access point, information on whether to reassociate the station associated with the adjacent access point with the access point, information on whether to accept reassociation with a station which is reassociation-requested from the access point, and information on whether to succeed the negotiation.

* * * * *